June 12, 1945.  C. SADOWSKY  2,377,905
NAVIGATION INSTRUMENT
Filed Oct. 29, 1943    5 Sheets-Sheet 1
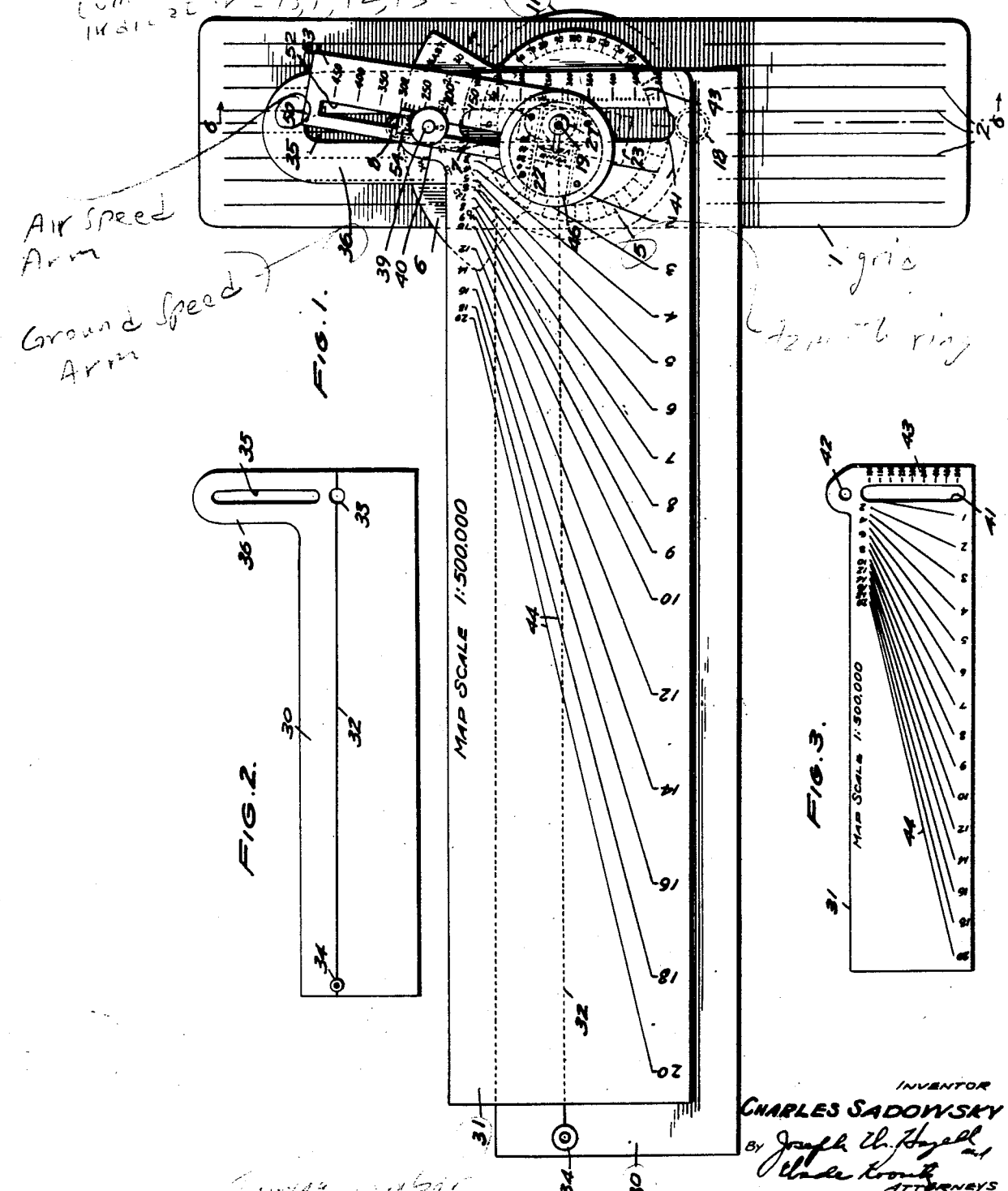

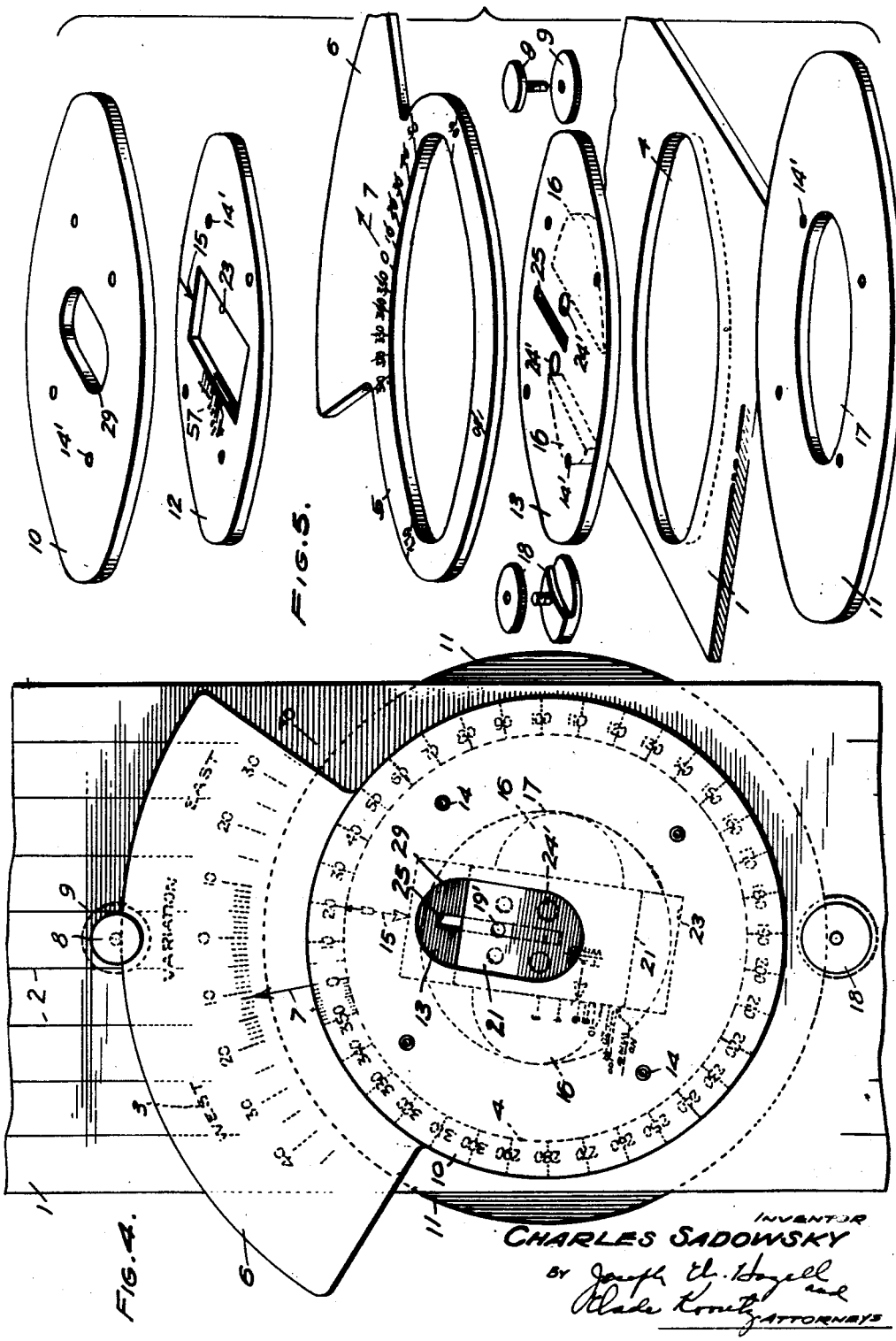

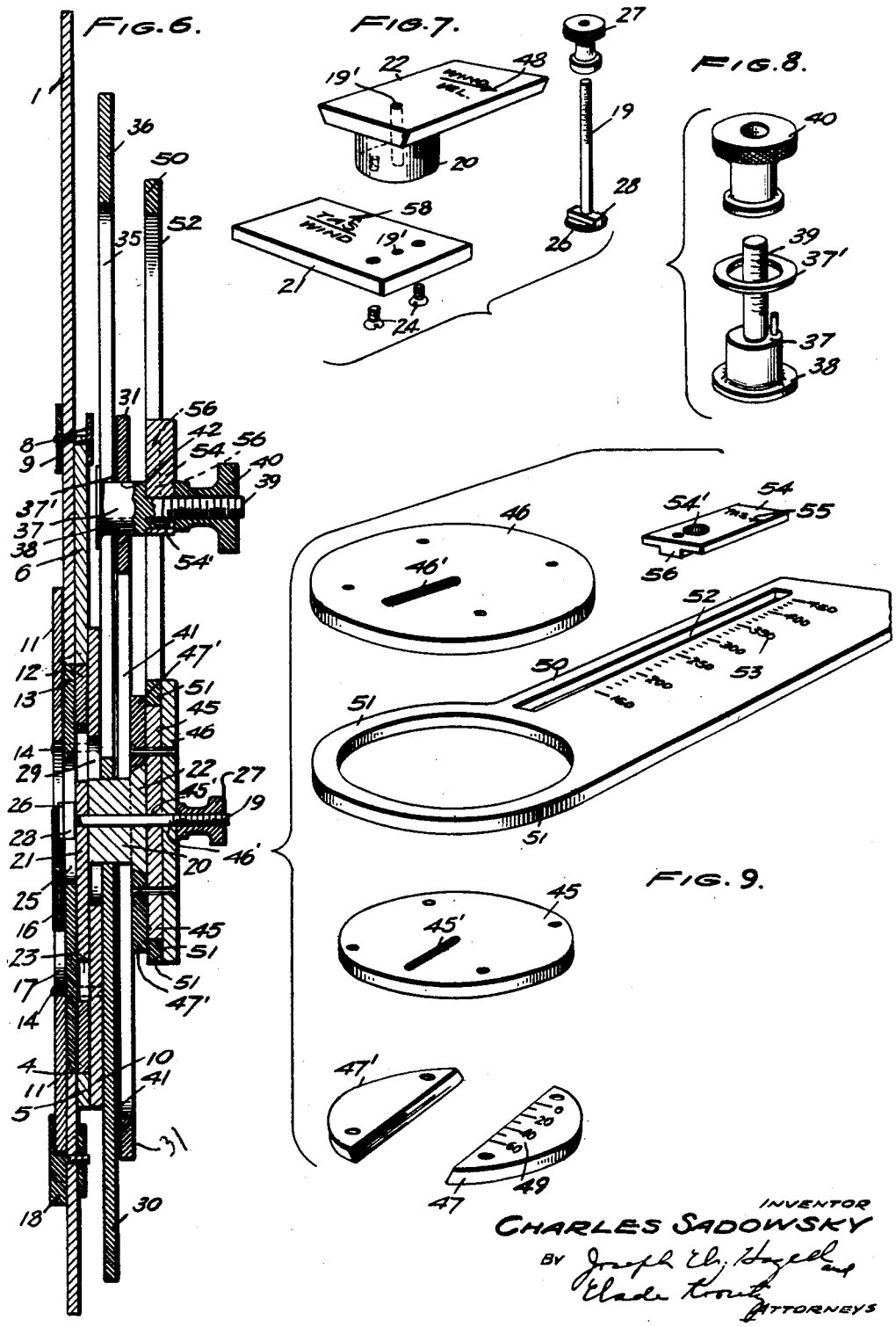

June 12, 1945. C. SADOWSKY 2,377,905
NAVIGATION INSTRUMENT
Filed Oct. 29, 1943 5 Sheets-Sheet 4

INVENTOR
CHARLES SADOWSKY

June 12, 1945.   C. SADOWSKY   2,377,905
NAVIGATION INSTRUMENT
Filed Oct. 29, 1943   5 Sheets-Sheet 5
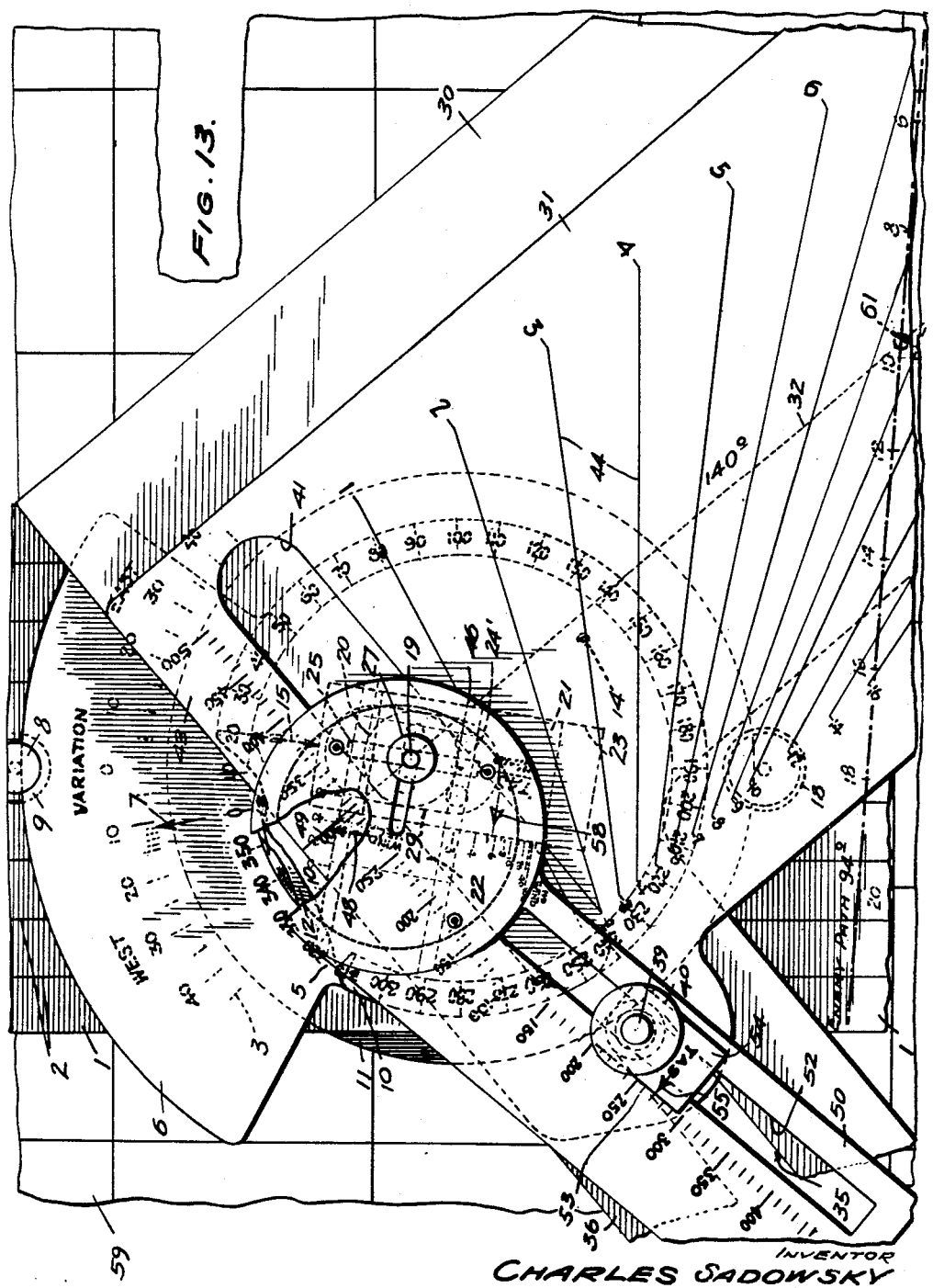

GEOMETRICAL INSTRUMENTS
98

Patented June 12, 1945

2,377,905

UNITED STATES PATENT OFFICE 2,377,905

NAVIGATION INSTRUMENT

Charles Sadowsky, New York, N. Y.

Application October 29, 1943, Serial No. 508,228

15 Claims. (Cl. 33—98)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an instrument for solving mechanically air navigational problems, particularly problems of interception, and thereby eliminating much of the work, time, and computations heretofore required.

The primary object of the invention is to provide an intercept instrument or plotter settably to known factors entering into an interception problem and which (when so set and appropriately placed on a map or chart on which are plotted the flight path and speed of the aircraft to be intercepted) provides means for projecting an interceptor course over the plotted flight path and for quickly and accurately ascertaining the point of interception, the time required to intercept, and the heading to achieve it.

Another object of the invention is to provide an intercept instrument by which, from known factors of magnetic variation, true airspeed, wind direction and velocity, the ground speed, course and heading for any direction required to perform an interception can be instantly determined and which, when oriented with a map or chart, shows directly the magnetic heading or vector to make good any condition of course, time, and distance.

A further object of the invention is to provide a navigation instrument which, though designed primarily for use in solving problems of air interception, also may be used for solving other types of navigational problems involving the same or similar factors in that simple settings from the known factors will give immediate results for any ground course desired, as long as the original factors hold true.

The instrument may be constructed for permanent installation and use on a plotting table or other support or it may be designed for use in the field; the size and material of the instrument being in accordance with space, scale and other requirements. A preferred embodiment of the portable type comprises an assemblage of various members of transparent plastic material pivotally and slidably connected together and having suitable scales, etc. for setting in known factors of magnetic variation, true airspeed, wind direction and velocity as hereinafter described and illustrated in the accompanying drawings, wherein—

Figure 1 is a top plan view of the instrument;

Figures 2 and 3 are detail views, in top plan and to a smaller scale, of the course arm and timing members, respectively;

Figure 4 is a large scale fragmentary view of the orientator unit, variation setting device, and wind-direction unit in assembled condition;

Figure 5 is an exploded view of the assembly shown in Figure 3, with the units in perspective;

Figure 6 is a longitudinal sectional view on line 5—5 of Figure 1; the parts being shown to a large scale for easier identification;

Figure 7 is an exploded view of the central unit or pivot of the instrument;

Figure 8 is an exploded view of the pilot pin;

Figure 9 is an exploded view of the airspeed indicator and wind-velocity disc assembly;

Figure 13 is an enlarged plan view of a portion of the chart and instrument shown in Figure 11.

Figure 10:
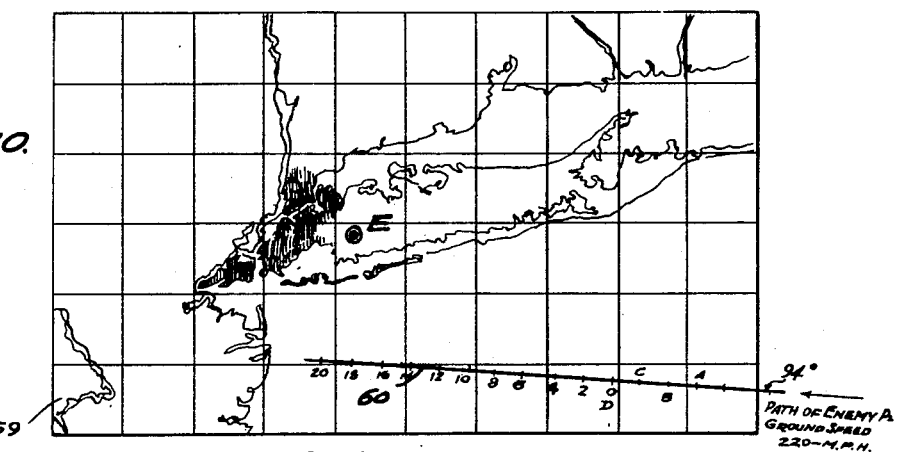
Figures 10, 11 and 12 are diagrammatic views illustrating the use of the instrument in solving an interception problem.

In the drawings, 1 indicates the orientator unit or grid of the instrument by means of which the latter is adapted to be supported in position on a map or chart with true north oriented. This grid consists of a plate or body of transparent material having spaced parallel North and South grid lines 2 thereon to be lined up with the meridians on the map or chart nearest to the point thereon over which the instrument is placed and from which bearings are to be taken. Maps and charts are based on the true meridian and give true bearings and courses. In order that the instrument may indicate magnetic bearing, the magnetic variation for the particular point or location on the map or chart must be set in the instrument. To this end, the grid 1 is provided with an arcuate magnetic variation scale 3 concentric with a circular opening 4 in the plate and appropriately marked throughout a range of forty (40) degrees East variation and West variation, respectively, on opposite sides of a zero representing true North. A magnetic direction member of transparent material, comprising an azimuth ring 5 having a sector-like appendage 6 on the zero-bearing side thereof, is mounted on the grid 1 in cooperative relation to the scale 3 with the azimuth ring concentrically bordering the opening 4 and the appendage 6 disposed over the scale 3. The appendage 6 serves as a convenient handle or thumb-piece for rotating the azimuth ring about the center of the opening 4 and is marked or otherwise provided with an indicator, such as the arrow 7, for setting the zero of the azimuth ring to the required number of degrees East or West on the variation scale. A headed screw 8 is carried by the grid 1 with a portion of its head disposed over the appendage 6 and its threaded shank depending through an opening in the latter by a thumb nut 9. The screw 8 and the nut 9 constitute a convenient setting-control for the magnetic direction member operating to hold the member in a given setting when the nut is turned to draw the head of the screw into frictional clamping contact with the appendage 6 and to release the member when the nut is loosened on the screw.

A wind-direction unit is mounted on the grid for rotation about the axis of the azimuth ring 5 and, as shown in Figure 5, comprises a group of four superposed concentric discs of transparent material in which the top and bottom discs 10 and 11 are larger in diameter than the two middle or spacer discs 12 and 13 to which they are rigidly fastened by rivets or other means 14 through holes 14'. The upper spacer disc 12 is sized to fit snugly but rotatably within the azimuth ring 5 with its top and bottom faces substantially flush with the corresponding faces of the ring. An inwardly directed radial arrow 15, marked "Wind mag," is provided on a marginal portion of the disc 12 and serves as a wind direction line or index for setting the disc relative to the azimuth ring to indicate a given direction of wind. In like manner, the lower spacer disc 13 has a running fit in the circular opening 4 of the grid 1. Friction pads 16 are provided on the underside of disc 13 and are exposed through a circular opening 17 in the bottom disc 11 for contact with the map or chart to keep the instrument from slipping thereon. The spacer discs 12 and 13 are retained within their respective locations on the orientator unit by the larger diametered top disc 10 which overlies the azimuth ring, and by the bottom disc 11 which underlies grid 1 and extends beyond the side edges of the grid to be conveniently grasped for turning the wind-direction unit about the axis. A setting control 18, of the screw and nut type similar to that previously described in connection with the magnetic direction member, is carried by grid 1 in cooperative relation with the disc 11 to be operated for preventing or permitting relative movement between the grip and the disc.

Coupled with the wind-direction unit so as to be turned therewith is the cardinal unit or central pivot of the instrument, shown in detail in Figure 7 and comprising a pivot or axis pin 19 and a carrier 20. The carrier 20 is a short cylindrical post having a radially disposed base slide 21 at one end and a radially disposed top slide 22 at the opposite end; the top slide being at an angle of ninety degrees clockwise to the base slide. The slides and post are apertured at 19' to provide a through opening or bore at the axis of the post to accommodate the axis pin 19. The base slide 21 is caged between the discs 10 and 13 of the wind-direction member for sliding movement in a rectangular slot 23 in the upper spacer disc 12 and is separably fastened to the pivot post 20 by screws 24. Slot 23 extends diametrically of the disc 12 in line with the "Wind mag" arrow 15 and is of a length sufficient to permit movement of the slide 21 therein for positioning the axis pin variably off-center with respect to the azimuth ring and in the reciprocal direction of the wind arrow. The axis pin 19 extends considerably above and below the top and bottom slides of the pivot post with its lower end depending through a narrow slot 25 in the disc 13 and provided with a clamping head 26. The head 26 is adapted to be drawn tightly against the undersurface of the disc 13, for clamping the pin in position relative to the azimuth ring, by the turning of a thumb nut 27 screwed on the threaded upper end of the pin. Turning of the pin during the screwing or unscrewing of the thumb nut is prevented by a suitable rib 28 on the head of the pin and sliding in the slot 25 which is elongated in the direction in which the pin and post are slidable when the thumb nut is loosened. The disc 13 is provided with openings 24' alignable with the screw holes in the base slide 21 for inserting or removing the pivot post attaching screws 24. The pivot post 20 extends upwardly from the slide 21 through an opening 29 in the disc 10 with the top slide 22 spaced above disc 10 to accommodate the ground course and timing members 30 and 31 of the instrument; the opening 29 being elongated in the direction in which the post is slidable.

The ground course member or arm 30 consists of a long flat strip of transparent material supported at one end on the disc 10 for turning movement about the pivot post 20 and having a ground course line 32 extending longitudinally thereof and through the centers of the pivot hole 33 and a knob 34. The pivot hole is located in the disc-supported end of the strip to receive the pivot post 20 of the central unit whereas the knob is mounted on the strip near the opposite end to provide a hand grip for moving the arm angularly about the pivot post for setting the ground course line in a given direction. An elongated slot 35 is provided in the ground course arm 30 along an extension of a radius of the pivot hole 33 at ninety degrees clockwise to the course line 32; the inner terminus of the slot being in closely spaced relation to the pivot hole 33 and the outer terminus being remote therefrom and within a right angle extension 36 of the strip. The slot 35 serves as a guideway for the pilot pin of the timing member. The pilot pin, as shown in detail in Figure 8 consists of a cylindrical runner portion 37 riding in the slot 35 and having a retaining head or flange 38 at one end engaged with the underside of the extension 36 in overlapping relation to the slot 35. A screw post 39 of smaller diameter than the cylindrical runner is formed integral with and centered on the other end of the runner and extends outwardly thereof to receive a large thumb nut 40. A spacer washer 37' encircles the runner between the ground course member 30 and the timing member 31, and the height of the cylindrical runner 37 above the retaining head 38 is slightly greater than the combined thickness of the washer and the ground course and timing members to adequately accommodate the same.

The timing member 31 comprises a scale plate formed of a long flat strip of transparent material disposed longitudinally over the ground course member for sliding movement transversely thereof and provided with a transverse slot 41 near one end to receive the pivot post 20 and a circular opening 42 in line with the slot 41 to fit over the runner 37 of the pilot pin. A ground speed scale 43 having a speed range of 100 miles per hour to 500 miles per hour is provided along the outer edge of the transverse slot 41. The space between the inner edge of the slot 41 and the far end of the strip is marked with a series of sloping lines converging at one edge of the strip and diverging at the opposite edge to provide a time scale 44; the lines radiating about a common center at the axis of the pilot pin and representing minutes of time. With the center of the thumb nut 27 representing zero, the minute lines are numbered 1, 2, 3 etc., in the order of their distances outwardly from the nut 27. The timing member also bears a legend reading "Map scale 1:500,000" indicating the scale of the particular map or chart with which the herein described instrument is designed to be used. Obviously, the instrument may be designed for use also with maps of larger or smaller scale. The pilot screw functions also as a driving connection between the ground course member 30 and the timing member 31 effective during the movement of the ground course member about the pivot post 20 to cause the timing member to revolve with the course member. The timing member also follows the rectilinear movement of the pilot screw whereby when the latter is moved along the guide slot 35 of the ground course member the timing member is slidably displaced on the ground course member in a direction ninety degrees clockwise to the ground course line 32 for varying the intersection of the course line with the ground speed scale 43 and the time scale 44. The ground speed for any course is read at the intersection of the course line 32 with the ground speed scale 43 and the intersections of this line with the sloping lines of the time scale 44 represent distances, measured to the scale of the map from the center or axis 19 of the instrument, covered along the course for each minute of travel at the indicated ground speed.

The actual ground speed of an airplane is the resultant of the true airspeed and the direction and velocity of the wind. The known factors of wind velocity and airspeed are set in the instrument by means of a wind velocity disc and an airspeed indicator, the details of which are shown in Figure 9. The wind velocity disc is a composite structure of transparent material including a circular disc 45 between and fastened to a plate 46 on the top side thereof and a pair of segments 47 and 47' on the bottom side; the segments being parallel and spaced apart to provide a guideway for the top slide 22 of the central pivot upon which the wind velocity disc is slidably supported and with which it turns when the wind-direction unit is rotated about the axis of the azimuth ring. The engaging edges of the segments and the slide 22 are beveled, as shown, to provide a dove-tail slide joint and the plate 46 and the slide 22 are appropriately slotted as at 46' and 45', respectively, to provide a clearance for the axis pin 19. An index arrow 48 marked "Wind/Vee" is carried by the slide 22 for reading a wind velocity scale 49 carried by the segment 47 and having a range of velocities from zero to sixty miles per hour, the scale and arrow being visible through the transparent plate 46. Scale 49 is correlated with the arrow 48 so that when the zero of the scale is opposite the arrow the wind velocity disc is concentric with the axis pin 19. The airspeed indicator includes a radius arm or lever 50 of transparent material having a ring or strap portion 51 at one end concentric with and freely encircling the velocity disc 45 between the plate 46 and the segments 47—47'; the disc 45 thus serving as a pivot or fulcrum for the radius arm. The plate and segments project beyond the periphery of the disc and overlap the strap to retain the arm upon the disc. The radius arm extends across the guideway 35 of the course arm and straddles the pilot pin of the timing member between the runner 37 and the thumb nut 40; the screw post 39 of the pilot pin being received in a guide slot 52 extending lengthwise of the radius arm along an extended radius of the disc 45. A scale 53 of airspeed velocities ranging from 150 miles per hour to 450 miles per hour is provided on the arm 50 adjacent a side edge of the slot 52 and a metal slide 54 having an index arrow 55 marked "T. A. S." is mounted on the screw post between the arm 50 and the pilot pin thumb nut 40 for movement therewith along the airspeed scale, the screw post extending upwardly through the opening 54' in the slide.

The pilot pin is freely slidable at all times in the slot 35 of the course arm 30 but is conditioned either to move with or relatively to the airspeed arm 50 by the adjustment of the thumb nut 40. When the thumb nut 40 is adequately loosened on the screw post, the pilot pin is free to be moved along the slot 52 of the airspeed arm for positioning the airspeed index arrow 55 opposite the graduation of the airspeed scale corresponding to a given airspeed and movement of the pilot pin in any direction along the airspeed slot 52 results in a corresponding movement of the ground speed scale 43 relative to the ground course line 32, due to the follower movement of the timing member 31 with the pilot pin. In order that the ground speed reading may be consistent with the airspeed reading, increasing and decreasing with airspeed, the scale markings on the ground speed scale 43 are arranged in inverse order to the scale markings on the airspeed scale 53 which increase in value toward the outer end of the airspeed slot 52. The position of the pilot pin in the airspeed slot, and hence, its radial distance from the axis of the wind velocity disc 45 depends upon the true airspeed and varies for different values of airspeed but is fixed for any setting on the airspeed scale to a particular airspeed value by screwing the thumb nut 40 tightly against the TAS slide to clamp the pilot pin, timing member, and airspeed arm against relative linear displacement. In still air or in the absence of a wind, the ground speed of an airplane is the same as its true airspeed. When the wind-velocity disc is centered about the central pivot 19 with the wind-velocity reading zero, the instrument is set for a condition of still air or "no wind." The ground speed and airspeed scale are so positionally related to the pilot pin that the ground speed reading resulting from the setting of the pilot pin to a given airspeed is the same, during the "no wind" setting of the instrument, as the airspeed reading and these readings are constant for all azimuth positions of the course line. This is so because the radial distance of the pilot pin from the central pivot 19 does not vary when the course arm is turned about the central pivot which is coaxial with the pivot or fulcrum disc 45 of the airspeed arm 50.

But when the disc 45, under the given condition, is set to indicate a given wind velocity other than zero it is off-center to the central pivot and the arc or circular orbit through which the airspeed arm is constrained to move with the course arm while concentric to the axis of the wind-velocity disc is at the same time eccentric to the axis of the central pivot. Hence, when the pilot pin is clamped in position on the airspeed arm at a given airspeed setting, its distance from the central pivot 19 varies during the turning movement of the arms within limits determined by the airspeed setting of the pin and the off-center setting of the wind-velocity disc, in accordance with the changes in the angular position of the pilot pin relative to the eccentric axes of the central pivot and the velocity disc; being least when the central pivot is between the pilot pin and the axis of the wind velocity disc, and being greatest when the opposite is true. The clamping of the pilot pin to the airspeed arm in no way interferes with the free sliding movement of the pin in the guide slot 35 of the course arm during the distance-changing phase, nor prevents the pin from turning about its axis with the TAS slide in accommodation to the slight rocker movement of the airspeed arm occasioned by the eccentric movement thereof during the angular setting of the ground course arm. A guide rib 56 on the underside of the TAS slide fits in the slot 52 of the airspeed arm and causes the TAS slide to rock with the airspeed arm to avoid any relative displacement of the TAS slide and airspeed scale which would change the setting of the airspeed. The pilot pin, about the axis of which the rocking movement occurs, is pinned or otherwise connected to the TAS slide to turn therewith.

The intersection of the course line with the ground speed scale, and hence the ground speed reading, varies for a given airspeed setting with the change in radial distance of the pilot pin from the central pivot of the instrument and at any given instant depends upon the angle between the ground course line 32 and the wind direction line 15. Thus, when the instrument is set so that wind arrow 15 is in line with and indicates a tail wind along the ground course line, the pilot pin is at its maximum distance from the central pivot, for the particular setting, and the intersection of the course line with the ground speed seal gives a ground speed reading which is the airspeed plus the velocity of the wind. When the relative position of the ground course line and the wind arrow are reversed in the instrument so that a head wind is indicated, the pilot pin is at its least distance from the central pivot and the intersection of the ground course line with the ground speed scale gives a ground speed reading which is the airspeed minus the velocity of the wind. Between these limits, the ground speed readings vary with the relative direction of the wind and the course line. It is thus apparent that the position of the timing member in relation to the course line is determined by the setting of the airspeed and the wind velocity, and the instant direction of the course line relative to the wind line. Hence, when the course arm is set to any desired course the ground speed for that course is instantly indicated where the course line intersects the ground speed scale.

The heading required to achieve a given course is set in the instrument as a function of the ratio of the wind to the true airspeed and is accomplished by moving the entire central assembly including the course arm 30, timing member 31, airspeed arm 50 and central pivot 19 off center to the azimuth ring. To this end a scale of ratio values representing fractions of the length of the radius of the azimuth ring is provided on disc 12 of the wind-direction unit adjacent a side of the slot 23 and an index arrow 58 marked TAS/Wind is carried by the slide 21 at right angles to the wind direction line for indicating on the scale 57 the position of the axis pin 19 with respect to the center of the azimuth ring. The off-center setting of the axis pin is dependent upon the ratio of the wind velocity to the true airspeed and is indicated by the position of the arrow 58 opposite the numbered graduations of the scale 57; the latter being correlated with the index arrow 58 so that when the axis pin 19 is centered within the azimuth ring, the arrow 58 is opposite a graduation of the scale 57 which is unnumbered but marked "no wind." When the central unit is off center to the azimuth ring, the heading for a given course is indicated where the ground course line crosses the periphery of the azimuth ring.

Figure 11:
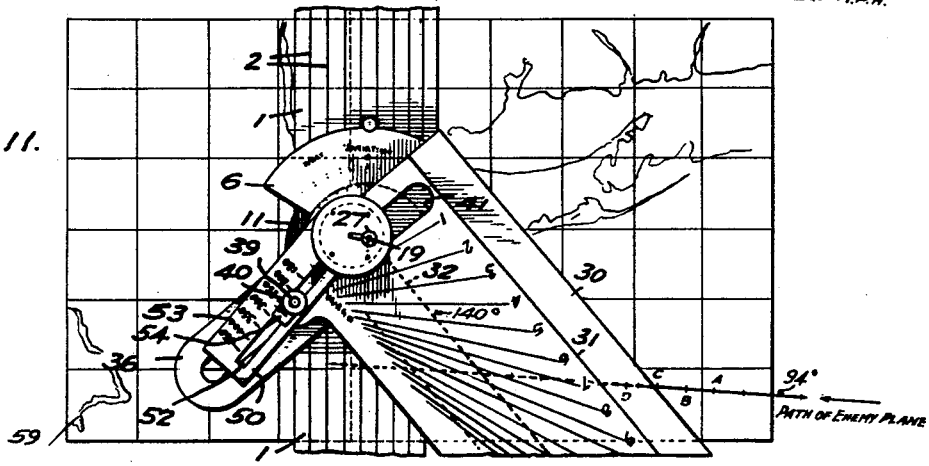
Figure 12:
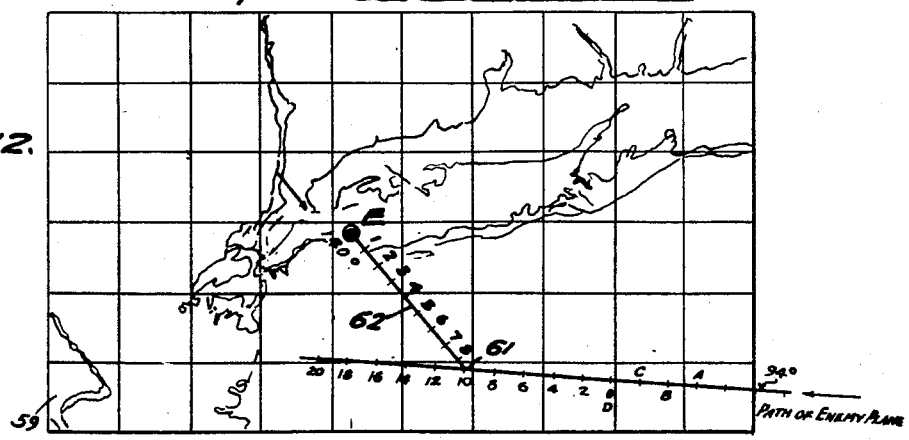

The application of the invention to solving a specific problem of interception is illustrated in Figures 10, 11 and 12, wherein is shown an aeronautical chart 59 representing a portion of a coastline. Hostile aircraft is reported heading toward the coast from position A on the chart. From additional reports as to the time and passage of the hostile aircraft over certain points, the successive positions B, C and D are plotted on the chart. From those plotted positions, the ground speed and the track of the enemy flight is found to be 220 M. P. H., and 94 degrees, respectively. The enemy flight is projected at the given angle from point D by a line 60 drawn on the chart and marked off in minutes of ground speed, as shown in Figure 10. A flight of pursuit airplanes, which is at the moment airborne over the base E, is ordered to intercept the hostile aircraft in the shortest possible time. The variation for the base E is 11 degrees West. The direction of the wind is 9 degrees true and its velocity is 50 M. P. H. The airspeed of the interceptor flight is 270 M. P. H.

Prior to placing the instrument on the chart, the factors of magnetic variation, wind direction, true airspeed divided by wind velocity, wind velocity, and true airspeed are set in the instrument and locked by the following procedure. Loosen the nut 9 and set the arrow 7 of the magnetic direction member to 11 degrees West variation on the variation scale 3. Lock the member 11 in place by tightening the nut 9. It is necessary to change this setting only when operating from a location of different variation. The wind direction is that direction from which the wind is blowing and is usually given as the true direction. Before setting it into the instrument it must be converted to magnetic. To do this add West variation to the true wind direction or subtract East variation. The given wind direction of 9 degrees true plus West variation 11 degrees equals 20 degrees magnetic and this is set into the instrument by releasing the lock nut of the setting control 18 and turning the bottom disc 11 of the wind direction unit relative to the grid plate and azimuth ring until the tail of the "Wind mag" arrow 15 on the inside of the azimuth ring is opposite the 20 degree mark. The wind direction unit is then locked in place by tightening the lock nut of the setting control 18. The given air speed of 270 M. P. H., divided by the given wind velocity of 50 M. P. H., equals a ratio value of 5.4. This value is set into the instrument while the latter is turned upside down for better visibility of the ratio scale 57. The small thumb nut 27 is loosened slightly and held with one hand while with the other hand the grid 1 having the azimuth ring fixed thereon is moved off center to the central unit or axis 20 of the instrument until the TAS/Wind arrow 58 is opposite a point on the ratio scale 57 corresponding to the ratio value of 5.4. The instrument is then turned right side up with the thumb nut 26 still released and the wind velocity is set by holding the grid 1 with one hand and sliding the wind-velocity disc with the other hand until the "Wind/Vel" arrow 48 is opposite the 50 mark on the wind velocity scale 49. The thumb nut 26 is then tightened to lock both the wind velocity setting and the TAS/Wind velocity setting. The true airspeed is set by holding the grid 1 with one hand, releasing the large thumb nut 40 of the pilot pin with the other hand, and sliding the pin and its associated parts along the airspeed arm until the TAS arrow 55 points to 270 on the airspeed scale 53 subsequent to which the nut 40 is tightened to hold the airspeed setting. The instrument is now ready for use on the chart 59.

The center of the axis pin 19 or the small thumb nut 27 thereon constitutes on the instrument the point of reference or origin corresponding to the point of departure of the interceptor aircraft or to the position of the latter when it is desired to change vectors. The instrument is placed on the chart with the thumb nut 27 centered over the position E and the grid plate 1 lined up with the meridian nearest to the position E so that the "O" of the variation scale is toward North, as shown in Figure 13. The operator presses down slightly on the thumb nut 27 to hold the plate in position and at the same time moves the course arm 30 by means of the knob 34 over the projected path 60 of the hostile aircraft. The time, in minutes, required for the interceptor aircraft to fly the distance between the point of departure and the point at which the course line 32 intersects the flight path 60 is read directly or by interpolation from the time scale 44. The time, also in minutes, required for the hostile aircraft to reach the intersection from the point D is read from the time markings on the line 60.

By moving the course arm over the flight path and comparing the respective flight times of the interceptor aircraft and the hostile aircraft, the operator can set the course arm quickly in a position at which the intersection of the course line with the enemy flight path occurs at a point where the flight time is the same for both interceptor and hostile aircraft or where the flight time of the former is slightly less than that of the latter. This point represents the point of interception and the course line represents the collision or near-collision course to the point of interception. The full line position of the course arm shown in Figure 11 represents the setting of the arm in the solution of the instant problem, the course line indicating a near collision course to the point of interception 61 where the flight time, approximately 8.5 minutes, of the interceptor aircraft compares favorably with the flight line, approximately 10 minutes, of the hostile aircraft. The ground speed along the interceptor course, read at the intersection of the course line with the ground speed scale 43, is 305 M. P. H. The magnetic heading required to make good the course is read at the intersection of the course line and the outer edge of the azimuth ring and is 140 degrees. The time required for the interceptor aircraft to reach point 61, as indicated on the time scale 44, is 8.5 minutes. Subsequent to marking the point 61, the instrument is displaced and a line or vector 62 is drawn on the chart connecting the point of departure E and the point of interception 61 as shown in Figure 12. This line is then marked off to indicate distances traveled in minutes of time according to the determined ground speed of 305 M. P. H. Should the enemy target change course or speed, thus requiring a correction in the course or vector 62, the operator projects the new direction of the target on the chart and moves the instrument to a position on the original vector 62 which corresponds to the time at which he will give the new vector. The operator then repeats the procedure as before.

Thus, given the enemy's direction and speed the operator can project the flight path of the interceptor aircraft over that of the enemy's and quickly and accurately determine the point of interception and the heading required to achieve it. It is obvious that similar procedure can be followed in any navigational problem where the factors are the same.

Having thus described my invention what I claim is:

1. A navigation instrument having a graduated ring, a wind disc rotatable about the axis of the ring and having a wind direction line and a slot directed radially of the axis and outwardly thereof in the reciprocal direction of the wind direction line, a scale of ratio values bordering one side of the slot and representing fractions of the length of the radius of the ring, a movable slide in the slot having an index movable therewith along the scale, and a ground course member having a ground-course line pivoted to the slide and extending across the ring.

2. A navigation instrument having a graduated ring, a wind-direction indicator rotatable about the axis of the ring, a movable pivot carried by the indicator and being non-rotative relative thereto but slidable thereon outwardly of the axis in the reciprocal direction of the indicated wind, cooperative means on the indicator and the pivot for indicating the instant position of the pivot relative to the axis in terms of ratio values representing fractions of the length of the radius of the ring, and a ground course indicator carried by and rotatable on the pivot and extending radially thereof across the ring.

3. A navigation instrument for use with a chart and comprising a base plate having spaced parallel grid lines and a magnetic variation scale relatively arranged so that the scale is oriented with the chart when the grid lines are lined up with the meridians of the chart, a rotatable azimuth ring on the base plate having an index for setting it relative to the variation scale, a wind-direction indicator rotatable about the axis of the ring, a movable pivot carried by the indicator and being non-rotative relative thereto but slidable thereon outwardly of the axis in the reciprocal direction of the indicated wind, cooperative means on the indicator and the pivot for indicating the instant position of the pivot relative to the axis in terms of ratio values representing fractions of the length of the radius of the ring, and a ground course indicator carried by and rotatable about the pivot and extending radially thereof and across the ring.

4. A navigation instrument comprising a support, a rotatable ground course member, and a rotatable airspeed scale pivoted to the support, the pivot of the airspeed scale being movable into and out of concentricity with the pivot of the ground course member, wind-velocity setting means connected to the movable pivot of the airspeed member for moving said pivot off-center of the pivot of the ground course member during the wind-velocity setting operation proportionately to the wind-velocity, an airspeed index settable on the airspeed scale to a given value of airspeed, and slidably connected with the ground course member to rotate therewith for turning the scale about its pivot, means for securing the index in its set position on the airspeed scale whereby its distance from the pivot of the ground course member varies during the rotation of the member and the scale about their respective pivots proportionately to the eccentricity of the pivots, and a ground speed indicator connected with the index to be operated by and proportionately to the eccentric movement of the index for indicating a ground speed which is a function of the airspeed and wind velocity settings and the eccentricity of the pivots.

5. A navigation instrument comprising a ground-course member and a wind-direction member angularly and relatively adjustable about a common axis and provided with a course-direction line and a wind-direction line, respectively, a body movable circularly about the axis, means confining the circular movement of the body to an orbit having an eccentricity proportional to a given wind velocity and a radius proportional to a given air-speed, driving means connecting the ground course member with the body and operating to move the latter in its orbit simultaneously with the movement of the ground course member about the axis, means correlating the movement of the body in its orbit with the movement of the ground course member about its axis so that when the course direction is in the same direction as the wind-direction line the body is spaced from the axis a distance equal to the radius of the orbit plus the eccentricity thereof, and a ground speed indicator connected to the body to be operated thereby during and proportionately to the movement of the body relative to the axis to indicate a ground speed directly proportional to the distance of the body from the axis.

6. A navigation instrument comprising a ground-course member and a wind-direction member angularly and relatively adjustable about a common axis and provided with a course-direction line and a wind-direction line, respectively, a body movable circularly about the axis, means confining the circular movement of the body to an orbit having an eccentricity proportional to a given wind velocity and a radius proportional to a given air-speed, driving means connecting the ground course member with the body and operating to move the latter in its orbit simultaneously with the movement of the ground course member about the axis, means correlating the movement of the body in its orbit with the movement of the ground course member about its axis so that when the course direction is in the same direction as the wind-direction line the body is spaced from the axis a distance equal to the radius of the orbit plus the eccentricity thereof, and a ground speed scale extending across the course-direction line and connected to the body to be moved thereby relative to the ground-course member for proportionately varying the intersection of the scale with the course-direction line to indicate a ground speed directly proportional to the distance of the body from the axis.

7. A navigation instrument having a graduated ring, a wind-disc rotatable about the axis of the ring and having a wind-direction line, a pivot on the wind-disc having a radial guideway directionally fixed relative to the wind-direction line, a fixed pointer on the pivot normal to the guideway, a transparent ground-course strip rotatable about the pivot and having a course-direction line and a guide slot extending radially of the pivot in directions having the same relative fixation as the directions of the guideway and wind-direction line; a wind-velocity disc mounted on the pivot and slidable along the guideway into and out of concentricity with the pivot, said wind-velocity disc having a scale of wind-velocities movable therewith across the pointer, an airspeed strip having a strap portion encircling the wind-velocity disc and a radial portion extending across the guide slot of the ground-course strip and provided with an airspeed scale, an airspeed index slidable along the said guide slot of the ground course strip and adjustably coupled with the airspeed strip to be selectively positioned along the airspeed scale, and a transparent ground speed strip between the ground course strip and the airspeed strip and having ground speed markings extending across the course-direction line, said ground speed strip having a pivotal slidable bearing on the pivot for following the movement of the airspeed index and being connected with the index to be moved thereby.

8. A navigation instrument having a graduated ring, a wind disc rotatable about the axis of the ring and having a wind direction line, a pivot on said disk having a radial guideway at right angles to the wind direction line, a transparent ground-course strip rotatable about the pivot and provided with a course direction line and a guide slot extending radially of the pivot at right angles to each other, a wind-velocity disc mounted on the pivot and slidable along the guideway into and out of concentricity with the pivot, wind-velocity scale means associated with the said pivot and the wind-velocity disc for indicating relative positions of the pivot and velocity disc in terms of wind-velocities, an airspeed strip having a strap portion encircling the wind-velocity disc and having a radial portion extending across the guide slot of the ground course strip and provided with an airspeed scale, an airspeed index slidable along the said guide slot of the ground course strip and adjustably coupled with the airspeed strip to be selectively positioned along the airspeed scale, and a transparent ground speed strip between the ground course strip and the airspeed strip and connected to the airspeed index for movement therewith, said ground speed strip having a pivotal sliding connection with the said pivot and having ground speed markings extending across the course direction line, including time distance-lines diverging from a common center at the point of connection between the ground speed strip and the airspeed index.

9. A navigation instrument comprising a course indicator and wind indicator rotatable about a common axis and respectively provided with a fixed reference line and a guide extending radially of the axis in predetermined relative angularity, the relative angularity between the reference line and guide of one indicator being the same as the relative angularity between the reference line and the guide of the other indicator, a pivot carried by the wind indicator and movable along the guide thereof into and out of eccentricity with the axis, a runner carried by the course indicator and pivotally connected with the movable pivot to turn thereon during rotation of the course indicator, said runner being movable along the course indicator guide for varying its radial distance from the pivot, airspeed setting means movable with the course indicator and connected with the runner for moving the latter and varying its radial distance from the pivot during the setting operation proportionally to the airspeed, wind-velocity setting means carried by the wind-indicator and connected with the movable pivot for moving the latter and varying its eccentricity during the setting operation proportionally to the wind velocity, releasable means associated with each of the setting means for maintaining a given setting thereof, and a ground speed indicator carried by the course indicator and operatively connected with the runner to be operated thereby during and proportionally to the movement of the runner in its guide to indicate a ground speed directly proportional to the distance of the runner from the axis.

10. An instrument having an azimuth ring, a wind-direction indicator carried by the ring, a central member carried by the indicator and movable off-center to the axis of the ring in the reciprocal direction of the indicated wind, means on the indicator identifying selectable off-center positions of the central member in terms of ratio valves corresponding to the ratio of the wind to the true airspeed, a disc on the central member movable off-center to the member in a path having a fixed directional position relative to the wind-direction indicator, means on the central member identifying selectable off-center positions of the disc in terms of wind-velocity, a rotatable course-arm carried by the central member, a slide connected with the course-arm for rotation therewith and slidable thereon toward and away from the central member along a path having the same fixed directional position relative to the course-arm that the path of the disc has to the wind-direction indicator, a follower constrained to move around the disc, a radius arm connecting the follower and the slide and having a guideway along which the slide is adjustable for varying its radial distance from the center of the disc, means on the radius arm identifying selectable radial distances in terms of airspeed velocity, and a ground speed representing member extending across the course arm and connected to the slide to be moved thereby with the same directional displacement relative to the course arm, said speed-representing member having time markings thereon intersecting the course arm at points the distances between which vary proportionately to the relative displacement of the course arm and the ground-speed representing member.

11. A navigation instrument comprising ground course member and a wind direction member angularly and relatively adjustable about a common axis, the ground course member having a ground-course line and the wind direction member having a wind-direction line, a member rotatable in a circular orbit about a movable center on the wind-direction line and displaceable outwardly of the center for changing the radius of the orbit, a manually settable airspeed indicator operatively connected with the rotatable member for displacing the same during the setting operation proportionately to the indicated airspeed, a manually settable wind-velocity indicator operatively connected with the movable center for moving and positioning the same eccentrically of the common axis during the setting operation proportionately to the indicated wind-velocity, a setting control associated with each indicator for maintaining a given setting thereof, means drivingly connecting the ground course member with the rotatable member and operating to move the rotatable member in its orbit simultaneously with the movement of the ground course member about the axis, the movement of the rotatable member being so correlated with the movement of the ground course member that when the course line is in the same direction as the wind line the radial distance of the rotatable member from the axis equals the radius of its orbit plus its eccentricity, and a ground speed indicator operatively connected with the rotatable member to be operated automatically thereby during and proportionately to the movement of the rotatable member relative to the axis to indicate a ground speed directly proportional to the radial distance of the rotatable member from the axis.

12. A navigation instrument having a graduated ring, a wind direction member rotatable about the axis of the ring and having a radial wind-direction line, a pivot on the wind-direction line, a ground course member rotatable about the pivot and having a radial course direction line, a runner on the ground course member slidable radially and outwardly of the pivot in a direction fixed relative to the course-direction line, a fulcrum on the pivot non-rotatable thereon but slidable radially thereof in a direction having the same fixation to the wind-direction line that the fixed direction of movement of the runner has to the course-direction line, a radius lever attached to the fulcrum concentrically thereof and engaged with the runner to be rotated thereby during rotation of the ground course member, said runner being adjustable longitudinally of the lever for varying its radial distance from the fulcrum, a manually settable airspeed-indicating device associated with the lever and operatively connected with the runner for moving the latter and varying its radial distance from the fulcrum during the setting operation proportionately to the airspeed, a manually settable wind-velocity indicating device operatively connected with the pivot and the fulcrum for moving the fulcrum and positioning it eccentrically of the pivot during the setting operation proportionately to the wind-velocity, and a ground speed indicator carried by the ground course member and operatively connected with the runner to be automatically operated thereby during and proportionately to the movement of the runner relative to the pivot for indicating a ground speed proportional to the radial distance of the runner from the pivot.

13 An instrument comprising an azimuth ring, a rotatable wind disc centered with the ring and having a wind-direction line, an arm rotatable about an axis on the wind disc and provided with a ground course line, a pivot associated with the wind disc and movable along a radial line having a fixed direction relative to the wind-direction line to be set selectively in a position centered with or off-center to the axis of the arm in accordance with a given wind velocity, wind velocity setting-means associated with the pivot and the wind disc to facilitate the setting of the pivot to the required position, a member carried by and turnable about the said pivot and having an airspeed scale, an index slidable on the member to a position opposite the scale corresponding to a given airspeed value, a setting control of cooperative means on the index and the member to be operated for preventing or permitting relative movement between the index and the member, means slidably and pivotally connecting the index with the arm and constraining the sliding motion of the index relative to the arm to a line having the same fixed direction to the ground course line that the line of movement of the pivot has to the wind-direction line, and a ground speed scale extending over the ground course line and fixed to the index to partake of the sliding movement of the latter relative to the arm for varying the intersection of the ground speed scale with the ground course line.

14. An instrument comprising a graduated ring, a rotatable wind disc centered with the ring and having a wind-direction line, an arm rotatable about an axis on the wind disc and having a reference line, a pivot associated with the wind disc and movable along a path having a fixed direction relative to the wind-direction line to be set selectively in a position centered with or off-center to the axis of the arm, a wind-velocity setting device connected with the pivot and the wind disc for positioning the latter off-center to the axis during the setting operation proportionately to the wind velocity, an airspeed scale extending radially of and turnable about the said pivot, an index slidable on the airspeed scale to a selected value of airspeed, a setting control of cooperative means associated with the said index and the said airspeed scale to be operated for preventing or permitting relative movement between the index and the scale, means slidably and pivotally connecting the index with the arm and constraining the sliding motion of the index relative to the arm to a path having the same fixed direction to the reference line that the path of the pivot has to the wind-direction line, and a ground-speed scale extending across the reference line and fixed to the index to partake of the sliding movement of the latter relative to the arm for varying the intersection of the scale with the reference line.

15. An instrument comprising an outer ring graduated in degrees, a central rotatable disc having a wind arrow and a guideway oppositely and radially directed relative to the axis of the ring, a scale along a radial edge of the guideway calibrated in wind-to-airspeed ratio values representing various radial distances from the axis of the ring, a post slidable along the guideway and having an index mark for indicating on the ratio scale the ratio value corresponding to the instant radial distance of the post from the said axis, a fixed guide on the post bearing ninety degrees in a clockwise direction from the wind arrow and having an index mark, a movable pivot slidable along the fixed guide into and out of concentricity with the post, a wind velocity scale arranged on the pivot so that zero of the scale is aligned with the guide index mark when the pivot and the post are concentric, a rotatable course arm fulcrumed on the post and having a course line and a guideway extending radially of the post in fixed divergent relation with the guideway bearing ninety degrees clockwise from the course line, an airspeed scale fulcrumed on the post and extending radially thereof across the course arm guideway, an airspeed index freely slidable along the course arm guideway and engaged with the airspeed scale to be selectively positioned thereon, and a movable scale plate on the course arm and having a time-distance scale extending across the course line, said scale plate being connected with the airspeed index to be moved crosswise of the course line by and proportionately to the movement of the airspeed index along the course arm guideway for varying the intersection of the scale and the course line.

CHARLES SADOWSKY.